Patented Feb. 13, 1940

2,190,128

UNITED STATES PATENT OFFICE 2,190,128

METHOD OF TREATING SOIL

Uno G. Stone, Pierson, Fla.

No Drawing. Application September 29, 1937,
Serial No. 166,418

16 Claims. (Cl. 47—58)

This invention relates to new and useful methods of treating soil to stimulate trees, plants and the like growing therein and more particularly to the treatment of soil around orange and tangerine trees to improve the taste and appearance of the fruit grown thereon.

Oranges and tangerines, particularly those grown in the State of Florida, are noticeably green in color and must be artificially colored in order to give them the characteristic "orange" appearance which is desirable not only from a commercial standpoint but also from the viewpoint of the purchaser and consumer. When oranges and tangerines are picked or cut from the trees, the short stem is allowed to remain attached to the fruit; however, the artificial coloring usually applied to such fruit causes these short stems to drop or fall off after short periods of time with the result that the fruit begins to decay at the seat of such stem, leading to the development of "stem rot.". This prevalent natural greenish color of oranges and tangerines which necessitates artificial coloring of the fruit is apparently due to a deficiency or lack of certain chemicals in the soil in which the orange and tangerine trees are grown and the principal object of this invention is to provide a method for treating the soil around orange and tangerine trees whereby the skins or peels of the fruit are provided with a natural "orange" color, thus eliminating the necessity for the usual artificial coloring thereof and the development of "stem rot" indirectly caused by the coloring matter.

Another object of the invention is to provide a method of soil treatment of the character set forth which will increase the sugar content of the fruit during ripening and impart to it a better flavor which will be retained until consumed.

A still further object of the invention is to provide a method of treating soil which will cause the fruit to ripen earlier and at the same time remain on the trees longer so that they may be picked as desired thus eliminating almost entirely the quite frequent occurrence of stem rot at the seat of the stem.

With these objects in mind, the invention consists essentially in the discovery that by treating the soil around orange and tangerine trees with ferric citrate or a compound or mixture containing that salt, particularly a mixture of ferric and ammonium citrate, I am able to greatly benefit and stimulate such trees and the fruit grown thereon. In instances where the soil around orange and tangerine trees is found to contain a nitrate or other suitable oxidizing agent, a ferrous citrate or compound or mixture containing that salt may be used and the nitrate or other oxidizing agent will oxidize the ferrous salt to the ferric compound when applied to or mixed with the soil. Superior results, however, are obtained by the use of a mixture of ferric and ammonium citrate and these superior results apparently are due to the fact that the presence of the ammonium citrate in the mixture renders the ferric citrate more readily soluble to the end that it is assimilated by the trees and plants to a greater degree or extent than when used alone.

This mixture of ferric and ammonium citrate, more commonly known as iron and ammonium citrate, may be purchased on the open market and its properties as well as several examples of methods by which it may be produced are given in detail in "The Dispensatory of the United States of America," twentieth edition, beginning at page 465, part I, thereof. Similar results, however, may be obtained, for example, by adding to the soil a suitable quantity of ferric citrate together with a compound such as ammonium sulphate or a nitrate and the plant or tree being treated will have available for assimilation the same elements as when the mixture of ferric ammonium citrate is added.

In practicing the invention, a suitable quantity of the chemical or the chemical mixed with a predetermined quantity of dry earth is worked into the soil around the tree or plant to be treated. I have found that satisfactory results in most instances are obtained by mixing approximately one part ferric ammonium citrate with approximately nine parts dry earth and then working the resulting mixture into the soil around and beneath the tree in the proportion of about one pound of such mixture for every foot of spread of the tree or plant radially from the trunk thereof. The dry earth mixed with the ferric ammonium citrate or other chemical as well as the soil around the tree or plant to which the dry earth chemical mixture is added should be on the acid side and preferably has a pH of between 5 and 6. Accordingly, as a step preparatory to carrying out the invention, both the dry earth for mixture with the chemical and the soil beneath the tree or plant to be treated are tested to determine the pH of each and in the event that the pH of either, is less than 5 or more than 6, it is preferably corrected or adjusted to a value within the above limits.

With respect to the proportions of dry earth and chemicals, it is pointed out that the stated proportions of dry earth and chemicals have been found by actual tests conducted over the period of more than a year to give superior results particularly when worked into the soil surrounding the tree in the proportion of approximately one pound for each foot of spread of said tree radially of or from the trunk thereof, it having been determined, for example, in the case of orange trees, that approximately one pound of such mixture is required for proper treatment of each box of fruit yielded and it is common knowledge in the orange growing industry that the number of boxes of fruit produced by each tree bears the quite definite ratio of 1 to 1 with respect to the spread of a given tree in feet; thus an orange tree with a ten foot spread will, over a period of years, produce an average of approximately ten boxes of fruit per year.

So far as regards the specified acidity of the mixture or soil, it has been determined by test and use of the invention that the most satisfactory results are obtained when said mixture and soil have a pH of between 5 and 6, the reason apparently being that within this range the desired compounds are more quickly formed and the friendly bacteria in the soil will grow faster and work better than under an acidity outside of these limits.

For best results orange and tangerine trees preferably are treated when the fruit has attained a size approximately one and one-quarter to one and one-half inches in diameter or approximately three months prior to the usual time of ripening thereof. Tangerines and oranges grown on trees treated according to my invention have a higher sugar content throughout the ripening period than in the case of trees that have not been treated and the color of the fruit is improved thus doing away with the necessity for artificially coloring the same and eliminating, substantially entirely, the occurrence of stem rot at the seat of the stem. The size and flavor of the fruit is also improved and retained for greater periods of time than that of fruit grown on untreated trees, and the oranges and tangerines will hang on the trees for a longer period than usual thus permitting it to be picked as desired according to the market.

The present method of treating soil also has been found to stimulate trees, and plants other than orange and tangerine trees and, for example, plants such as ferns or the like which frequently turn "yellow" with age or excessive exposure to the heat of the sun may be provided with a more natural deeper "green" color which will be retained by the plant substantially throughout its life. Furthermore, plants such as ferns and the like treated according to my invention are more healthy and long-living than plants which have not been so treated and the characteristic so-called "shedding" which sometimes occurs in plants of this type is almost entirely eliminated. Other plants, trees and the like, however, may be stimulated and improved as respects their health, appearance and length of life, by treating the soil in which they are growing in accordance with this invention and for this reason I do not wish to be understood as limiting my invention to the treatment of orange and tangerine trees and plants such as ferns or the like but the same may be employed in the treatment of the soil around trees, plants and the like generally, within the scope of the annexed claims.

I claim:

1. The method of treating soil to stimulate trees, plants and the like growing therein which consists in adding to said soil a substance which provides ferric citrate for assimilation by said trees, plants and the like, said substance being added to the soil in a quantity providing said ferric citrate in the proportion of approximately one-tenth pound for each foot of spread of the tree or plant radially from the trunk thereof.

2. The method of treating soil to stimulate trees, plants and the like growing therein which consists in adding to said soil ferric citrate for assimilation by said trees, plants and the like, said ferric citrate being added to the soil in the proportion of approximately one-tenth pound for each foot of spread of the tree or plant radially from the trunk thereof.

3. The method of treating soil to stimulate trees, plants and the like growing therein which consists in adding to said soil a substance which provides ferric citrate and an ammonium radical for assimilation by said trees, plants and the like, said substance being added to the soil in a quantity providing said ferric citrate and ammonium radical in the proportions of approximately one-tenth pound for each foot of spread of the tree or plant radially from the trunk thereof.

4. The method of treating soil to stimulate trees, plants and the like growing therein which consists in adding to the soil ferric and ammonium citrate in the proportion of approximately one-tenth pound for each foot of spread of the tree or plant radially from the trunk thereof.

5. The method of treating soil to stimulate trees, plants and the like growing therein which consists in adding to the soil a mixture containing ferric and ammonium citrate and dry earth, said mixture being added to the soil in the proportion of approximately one pound for each foot of spread of the tree or plant radially from the trunk thereof.

6. The method of treating soil to stimulate trees, plants and the like growing therein which consists in adding to the soil a mixture of dry earth and a substance which provides ferric citrate for assimilation by said trees, plants and the like, said mixture being added to the soil in the proportion of approximately one pound for each foot of spread of the tree or plant radially from the trunk thereof.

7. The method of treating soil to stimulate trees, plants and the like growing therein which consists in adding to the soil a mixture containing approximately one part ferric and ammonium citrate and approximately nine parts dry earth.

8. The method of treating soil to stimulate trees, plants and the like growing therein which consists in adding to the soil a mixture containing approximately one part ferric and ammonium citrate and approximately nine parts dry earth, said mixture being added to the soil in the proportion of approximately one pound for each foot of spread of the tree or plant radially from the trunk thereof.

9. The method of treating soil to stimulate trees, plants and the like growing therein which consists in adding to the soil a mixture of dry earth and a substance which provides ferric citrate for assimilation by said trees, plants and the like, said dry earth and said substance being present in said mixture in the ratio of approximately 9 parts to 1 part respectively, and the soil and dry earth having a pH of 5 to 6.

10. The method of treating soil to stimulate trees, plants and the like growing therein which consists in adding to the soil a mixture of dry earth and a substance which provides ferric citrate for assimilation by said trees, plants and the like, said dry earth and said substance being present in said mixture in the ratio of approximately 9 parts to 1 part respectively, and the mixture being added to the soil in the proportion of approximately one pound thereof for each foot of spread of the trees, plants and the like radially from the trunk.

11. The method of treating soil to stimulate trees, plants and the like growing therein which consists in adding to the soil a mixture containing ferric and ammonium citrate and dry earth, said dry earth and said substance being present in said mixture in the ratio of approximately 9 parts to 1 part respectively.

12. The method of treating soil to stimulate trees, plants and the like growing therein which consists in adding to the soil a mixture containing ferric and ammonium citrate and dry earth, said dry earth and said substance being present in said mixture in the ratio of approximately 9 parts to 1 part respectively, and the mixture being added to the soil in the proportion of approximately one pound thereof for each foot of spread of the trees, plants and the like radially from the trunk.

13. The method of treating soil to stimulate trees, plants and the like growing therein which consists in adding to the soil a mixture of dry earth and a substance which provides ferric citrate and an ammonium radical for assimilation by said trees, plants and the like, said soil and dry earth having a pH of 5 to 6.

14. The method of treating soil to stimulate trees, plants and the like growing therein which consists in adding to the soil a mixture of dry earth and a substance which provides ferric citrate and an ammonium radical for assimilation by said trees, plants and the like, said dry earth and said substance being present in said mixture in the ratio of approximately 9 parts to 1 part respectively.

15. The method of treating soil to stimulate trees, plants and the like growing therein which consists in adding to the soil a mixture of dry earth and a substance which provides ferric citrate and an ammonium radical for assimilation by said trees, plants and the like, said mixture being added to the soil in the proportion of approximately one pound for each foot of spread of the tree or plant radially from the trunk thereof.

16. The method of treating soil to stimulate trees, plants and the like growing therein which consists in adding to the soil a mixture of dry earth and a substance which provides ferric citrate and an ammonium radical for assimilation by said trees, plants and the like, said dry earth and said substance being present in said mixture in the ratio of approximately 9 parts to 1 part respectively, and the mixture being added to the soil in the proportion of approximately one pound thereof for each foot of spread of the trees, plants and the like radially from the trunk.

UNO G. STONE.